Jan. 16, 1934.  J. P. ROCK  1,943,930
BRAKE AND CLUTCH
Filed Aug. 7, 1931
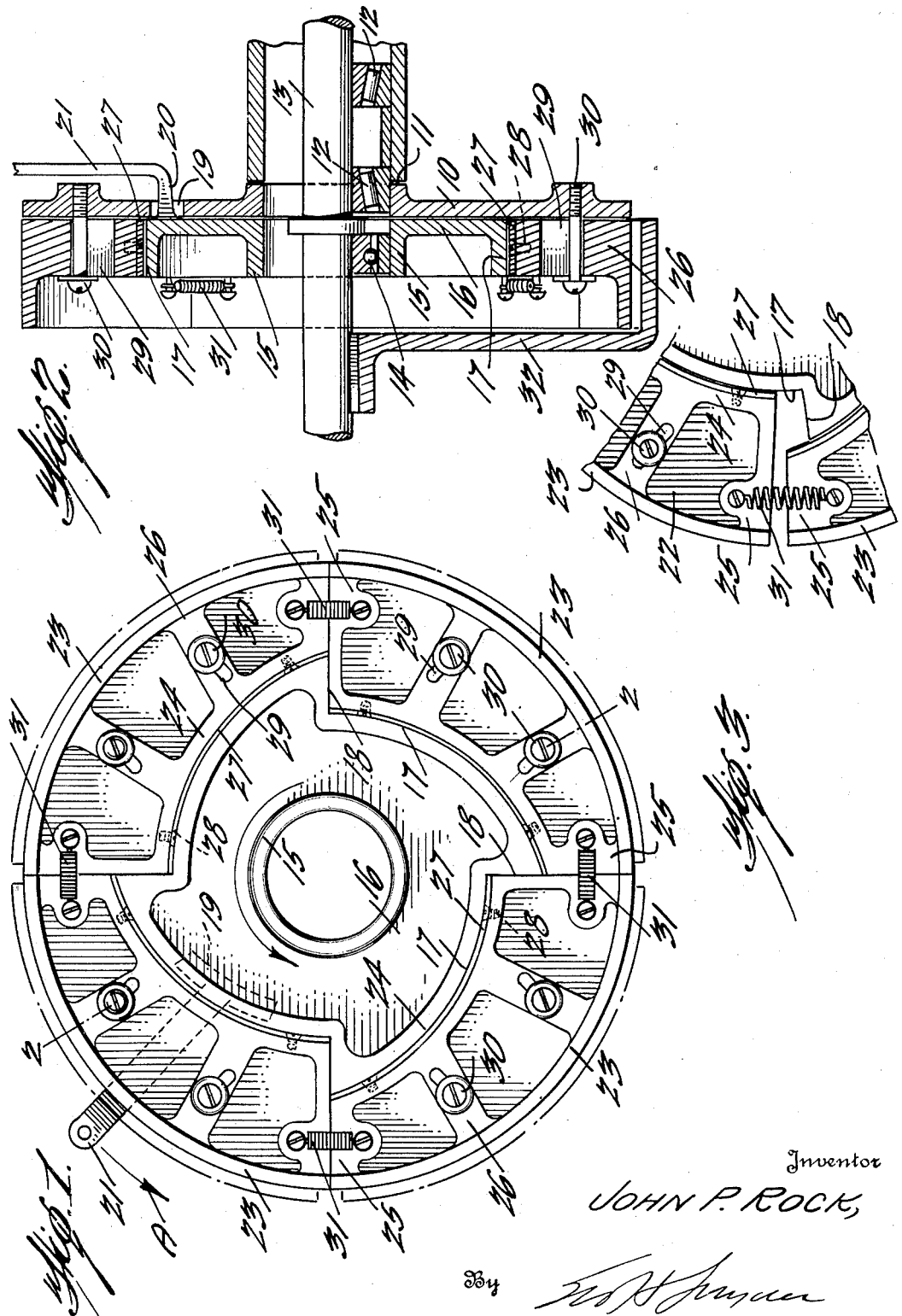
Inventor
JOHN P. ROCK,
By
Attorney Patented Jan. 16, 1934

1,943,930

UNITED STATES PATENT OFFICE 1,943,930

BRAKE AND CLUTCH

John Paul Rock, Duluth, Mo.

Application August 7, 1931. Serial No. 555,821

1 Claim. (Cl. 188—78)

This invention relates to friction applying devices such as brakes and friction clutches.

One object of the invention is to improve the general construction of devices of this character.

A second important object of the invention is to provide an improved form of such device having novel means for causing expansion movement of a series of friction applying segments.

A third important object of the invention is to provide a novel device of this character having means for taking the wear of certain parts, such means being arranged for ready replacement so that the device may be maintained in proper condition at slight expense.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a face view of the device.

Figure 2 is a section on the line 2—2 of Figure 1.

Figure 3 is a detail view of a portion of Figure 1 but showing certain friction segments in expanded or active positions.

In the embodiment of the invention here shown the friction applying device has been illustrated as used in connection with a brake and in the construction of this form of the invention there is provided a base plate 10 which may be fixed immovably by suitable means not here shown. For instance this base plate may be carried on the end of a vehicle axle housing. The base plate 10 is provided with a central hub 11 which receives the axle bearing 12 so that an axle 13 may pass therethrough and revolve freely therein. On the shaft 13 is also mounted a bearing 14 on which fits the hub 15 of a cam plate 16 having a peripheral flange consisting of a series of arcuate portions 17 eccentric to the hub 15 and having their adjacent ends connected by radial portions 18 forming stops as will be presently seen. In the plate 10 is formed an arcuate slot 19 concentric to the axis of the shaft and an arm 20 is carried by the cam plate 16 and projects through the slot, the end of the arm being bent to extend radially outward and form an operating lever by means of which the cam may be rotatably moved with reference to the plate 10. Surrounding this cam member is a series of friction segments each consisting of a plate 22 having an arcuate flange 23 at its outer edge concentric to the shaft axis and having an arcuate flange at its inner edge parallel to the respective flange 17 and of substantially equal length thereto. End flanges 25 connect the ends of the flange 24 of each segment with the ends of flange 23 of said segment and radial ribs 26 also extend between these flanges. These segments are thus arcuately tapered from end to end and the inner part of the larger end of each segment bears against a respective stop shoulder on the cam member. Secured to the inner face of each flange 24 is a wear strip 27 which is held in place by screws 28 so that a worm strip may be easily replaced. Each rib 26 is provided with a slot 29 extending radially of the device and through these slots extend screws 30 which screw into the plate 10 and thus hold the friction segments to the plate while permitting radial movement of said segments. The adjacent segments have their ends connected by tension springs 31 which serve to hold the segments closely in engagement with the cam at all times.

On the shaft 13 is fixed a brake drum 32 wherewith the segments frictionally engage upon the cam being moved to force the segments outwardly.

In operation the lever 21 is moved in the direction of the arrow A in Figure 1 which causes the cam to move in the same direction and thereby forces the friction segments outwardly into engagement with the flange of the drum 32. To release the brake the lever is moved in the opposite direction.

Obviously this device may be used as a clutch for two sections of a shaft by fixing the plate 10 on one shaft section and the drum 32 on the other shaft section.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

The combination with a brake drum having a cylindrical side wall and a flat end wall, of a series of brake segments in said drum each having a flat end wall at the open end of the drum and each having an arcuate outer wall of equal width to and adapted to bear throughout its extent against the inner face of the drumside wall, each segment further having an arcuate inner wall of less width than the drum and radial end walls connecting the inner outer walls whereby the segments form a circular series of arcuate wedges, said segments having radial ribs between the arcuate walls each provided with a slot, the outer walls of the segments serving to hold the remainder of said segments spaced from the end wall of the drum whereby to form a chamber, a shaft concentric to the drum and keyed thereto, a cam member having a flat end wall meeting with the flat end walls of the segments and having eccentric outer side walls conforming in curvature and width to the inner walls of the segments, said cam member having radial walls connecting the ends of its adjacent outer side walls, a cover plate at the open side of the drum covering said segments and cam member, screws extending through the slots of the segments into said cover plate and having their heads in said chamber, tension springs in said chamber connecting said segments, and means to shift the cam member about the shaft with respect to said segments.

JOHN PAUL ROCK.